United States Patent [19]

Schriever

[11] Patent Number: 5,411,606
[45] Date of Patent: May 2, 1995

[54] NON-CHROMATED OXIDE COATING FOR ALUMINUM SUBSTRATES

[75] Inventor: Matthias P. Schriever, Kent, Wash.

[73] Assignee: The Boeing Company, Seattle, Wash.

[21] Appl. No.: 903,853

[22] Filed: Jun. 25, 1992

Related U.S. Application Data

[63] Continuation-in-part of Ser. No. 525,800, May 17, 1990, Pat. No. 5,298,092, and a continuation-in-part of Ser. No. 621,132, Nov. 30, 1990, abandoned, and a continuation-in-part of Ser. No. 732,568, Jul. 19, 1991, abandoned.

[51] Int. Cl.$^6$ ............................................. C23C 22/00
[52] U.S. Cl. ................................. 148/240; 106/1.25; 106/1.27; 148/243; 148/273; 148/275; 148/285; 148/286
[58] Field of Search ............... 148/240, 243, 273, 275, 148/285, 286; 106/1.25, 1.27

[56] References Cited

U.S. PATENT DOCUMENTS

| | | | |
|---|---|---|---|
| 1,551,613 | 9/1925 | Pacz | 148/273 |
| 1,607,676 | 11/1926 | Jirotka | 148/242 |
| 2,796,370 | 6/1957 | Ostrander et al. | 148/268 |
| 2,796,371 | 6/1957 | Ostrander et al. | 148/268 |
| 2,906,009 | 9/1959 | Knoll et al. | 427/435 |
| 3,138,479 | 6/1964 | Foley | 427/305 |
| 3,403,035 | 9/1968 | Schneble et al. | 427/443.1 |
| 3,423,214 | 1/1969 | Koretzky | 106/1.22 |

(List continued on next page.)

FOREIGN PATENT DOCUMENTS

| | | |
|---|---|---|
| 39376/89 | 8/1990 | Australia . |
| 356756 | 7/1990 | European Pat. Off. . |
| 0405340 | 1/1991 | European Pat. Off. . |

(List continued on next page.)

OTHER PUBLICATIONS

M. Munakata, "Some New Oxygenated Cobalt Complexes," *Bulletin Of The Chemical Society of Japan*, vol. 44, pp. 1791–1796 (1971).

S. Fukuzumi et al., "Activation Of Cobalt(III)–Alkyl Bonds Through Interaction With Organic Oxidants ...," *Chemistry Letters*, pp. 421–424 (1984).

(List continued on next page.)

Primary Examiner—Melvyn J. Andrews
Assistant Examiner—Robert R. Koehler
Attorney, Agent, or Firm—Paul C. Cullom, Jr.

[57] ABSTRACT

(A) A process for forming an oxide film cobalt conversion coating on a metal substrate, thereby imparting corrosion resistance and paint adhesion properties. The invention was developed as a replacement for the prior art chromic acid process. The process includes the steps of: (a) providing a cobalt conversion solution comprising an aqueous reaction solution containing a soluble cobalt-III hexacoordinated complex, the concentration of the cobalt-III hexacoordinated complex being from about 0.01 mole per liter of solution to the solubility limit of the cobalt-III hexacoordinated complex; and (b) contacting the substrate with the aqueous reaction solution for a sufficient amount of time, whereby the cobalt conversion coating is formed. The substrate may be aluminum or aluminum alloy, as well as Cd plated, Zn plated, Zn—Ni plated, and steel. The cobalt-III hexacoordinated complex may be present in the form of $Me_m[Co(R)_6]_n$, wherein Me is Na, Li, K, Ca, Zn, Mg, or Mn, and wherein m is 2 or 3, n is 1 or 2, and R is a carboxylate having from 1 to 5 C atoms.

(B) A chemical conversion coating solution for producing the cobalt conversion coating on a metal substrate, the solution including an aqueous reaction solution containing a soluble cobalt-III hexacoordinated complex, the concentration of the cobalt-III hexacoordinated complex being from about 0.01 mole per liter of solution to the solubility limit of the cobalt-III hexacoordinated complex.

(C) A coated article exhibiting acceptable corrosion resistance and paint adhesion properties, the article including: (a) a metal substrate; and (b) an oxide film cobalt conversion coating formed on the substrate, the cobalt conversion coating including aluminum oxide $Al_2O_3$ as the largest volume percent, and cobalt oxides CoO, $Co_2O_3$, and $Co_3O_4$.

81 Claims, 3 Drawing Sheets

U.S. PATENT DOCUMENTS

| | | | |
|---|---|---|---|
| 3,438,798 | 4/1969 | Baudrand et al. | 427/305 |
| 3,444,007 | 5/1969 | Maurer et al. | 148/273 |
| 3,592,747 | 7/1971 | Cohn | 148/279 |
| 3,615,740 | 10/1971 | Goltz | 106/14.11 |
| 3,790,453 | 2/1974 | Wanamaker et al. | 204/37.6 |
| 3,819,424 | 6/1974 | Russell et al. | 148/261 |
| 3,870,607 | 3/1975 | Bardach | 204/15 |
| 3,877,981 | 4/1975 | Arnold | 106/1.25 |
| 3,905,838 | 9/1975 | Ito | 148/271 |
| 3,928,237 | 12/1975 | Davis | 502/313 |
| 3,954,510 | 5/1976 | Gunn et al. | 148/267 |
| 3,993,510 | 11/1976 | Bellavin | 148/267 |
| 4,088,486 | 5/1978 | Bissonette | 430/393 |
| 4,150,172 | 4/1979 | Kolk, Jr. | 427/305 |
| 4,208,212 | 2/1980 | Kuzuwata et al. | 148/259 |
| 4,218,240 | 8/1980 | Gingerich et al. | 75/365 |
| 4,233,063 | 11/1980 | Ritsko et al. | 75/374 |
| 4,261,766 | 4/1981 | Crouch | 148/273 |
| 4,278,463 | 7/1981 | Vanderpool et al. | 75/353 |
| 4,278,477 | 7/1981 | Reinhold | 106/14.15 |
| 4,337,097 | 6/1982 | Tokumasu et al. | 148/253 |
| 4,348,224 | 9/1982 | Gingerich et al. | 75/353 |
| 4,381,203 | 4/1983 | Reinhold | 148/270 |
| 4,392,920 | 7/1983 | McDonald | 204/37.1 |
| 4,631,093 | 12/1986 | Etemovich | 148/244 |
| 4,637,374 | 1/1987 | Arai | 126/417 |
| 4,647,347 | 3/1987 | Schoener | 148/273 |
| 4,659,605 | 4/1987 | Malik et al. | 427/131 |
| 4,696,724 | 9/1987 | Deguchi et al. | 205/197 |
| 4,804,407 | 2/1989 | Scheithauer et al. | 75/372 |
| 4,897,129 | 1/1990 | Tuttle, Jr. et al. | 148/256 |

FOREIGN PATENT DOCUMENTS

| | | | |
|---|---|---|---|
| 0458020A1 | 11/1991 | European Pat. Off. | |
| 0488430A2 | 6/1992 | European Pat. Off. | |
| 0523288A1 | 1/1993 | European Pat. Off. | |
| 745704 | 11/1944 | Germany . | |
| 61-238979 | 10/1986 | Japan | 148/286 |
| 953987 | 4/1964 | United Kingdom | 427/305 |
| 1345868 | 2/1974 | United Kingdom | 427/305 |
| WO91/11542 | 8/1991 | WIPO . | |

OTHER PUBLICATIONS

I. Sasaki et al., "X-Ray And Electrochemical Investigation Of A Series of Cobalt Complexes...", *Polyhedron*, vol. 6, pp. 2103–2110 (1987).

European Search Report on Appln. No. EP 91 20 2181 (corr. to U.S. Appln. No. 07/621,132) dated 12 Oct. 1992.

Pascal, "Nouveau Traité de Chimie Minérale" 1959, Masson & Cie, Paris, Fr. vol. XVIII, pp. 680–681: Cobaltnitrites.

Chemical Abstracts, vol. 89, 1978, abstract No. 122118c, Complexes of Cobalt containing ammonia or ethylenediamine.

European Search Report on Appln. No. EP 91 20 2515 (corr. to U.S. Appln. No. 07/732,568) dated 9 Oct. 1992.

G. Jander and E. Blasius, "Einfuhrung in das anorganisch–chemische Praktikum" (1968), pp. 106–107. (No translation).

*Van Nostrand's Scientific Encyclopedia* (1983), Sixth Edition, vol. I: p. 124, "Ammines".

"Deposition of Nickel and Cobalt by Chemical Reduction", Brenner and Riddell, *Journal of Research of the National Bureau of Standards*, vol. 39: pp. 385–395 (Nov. 1947).

"Nickel and Cobalt Films" by Samuel Wein, *The Glass Industry*, pp. 22, 23, 35, 46 (Jan. 1960).

"Regulating Coercivity of Magnetic Thin Films", Tsu & Sakamoto, *IBM Technical Disclosure Bulletin*, pp. 52–53, vol. 4, No. 8 (Jan. 1962).

European Search Report on Application No. EP 91 10 3498 dated 28 Jun. 1991, The Hague.

W. Fernelius ed., "69. Hexamminecobalt(III) Salts," *Inorganic Syntheses*, first edition, vol. II, pp. 216–221 (McGraw-Hill 1946).

A. Martell and M. Calvin, *Chemistry Of The Metal Chelate Compounds*, pp. 1–18 (Prentice-Hall 1952).

NON-CHROMATED OXIDE COATING FOR ALUMINUM SUBSTRATES

CROSS-REFERENCE TO RELATED APPLICATIONS

This application is a continuation-in-part of application Ser. No. 07/525,800, filed May 17, 1990, (now U.S. Pat. No. 5,298,092), which application is incorporated herein by reference. This application is also a continuation-in-part of application Ser. No. 07/621,132, filed Nov. 30, 1990, now abandoned, which application is incorporated herein by reference. This application is also a continuation-in-part of application Ser. No. 07/732,568, filed Jul. 19, 1991, now abandoned, which application is incorporated herein by reference. These prior applications are expressly incorporated herein by reference.

FIELD OF THE INVENTION

This environmental-quality invention is in the field of chemical conversion coatings formed on metal substrates, for example, on aluminum substrates. More particularly, one aspect of the invention is a new type of oxide coating (which I refer to as a "cobalt conversion coating") which is chemically formed on metal substrates. The invention enhances the quality of the environment of mankind by contributing to the maintenance of air and water quality.

BACKGROUND OF THE INVENTION

In general, chemical conversion coatings are formed chemically by causing the surface of the metal to be "converted" into a tightly adherent coating, all or part of which consists of an oxidized form of the substrate metal. Chemical conversion coatings can provide high corrosion resistance as well as strong bonding affinity for paint. The industrial application of paint (organic finishes) to metals generally requires the use of a chemical conversion coating, particularly when the performance demands are high.

Although aluminum protects itself against corrosion by forming a natural oxide coating, the protection is not complete. In the presence of moisture and electrolytes, aluminum alloys, particularly of the high-copper 2000-series aluminum alloys, such as alloy 2024-T3, corrode much more rapidly than pure aluminum.

In general, there are two types of processes for treating aluminum to form a beneficial conversion coating. The first is by anodic oxidation (anodization) in which the aluminum component is immersed in a chemical bath, such as a chromic or sulfuric acid bath, and an electric current is passed through the aluminum component and the chemical bath. The resulting conversion coating on the surface of the aluminum component offers resistance to corrosion and a bonding surface for organic finishes.

The second type of process is by chemically producing a conversion coating, which is commonly referred to as a chemical conversion coating, by subjecting the aluminum component to a chemical solution, such as a chromic acid solution, but without using an electric current in the process. The chemical solution may be applied by immersion application, by manual application, or by spray application. The resulting conversion coating on the surface of the aluminum component offers resistance to corrosion and a bonding surface for organic finishes. The present invention relates to this second type of process for producing chemical conversion coatings. The chemical solution may be applied by immersion application, by various types of manual application, or by spray application.

One widely-used chromic acid process for forming chemical conversion coatings on aluminum substrates is described in various embodiments in Ostrander et al. U.S. Pat. No. 2,796,370 and Ostrander et al. U.S. Pat. No. 2,796,371, in military process specification MIL-C-5541, and in Boeing Process Specification BAC 5719. These chromic acid chemical conversion baths contain hexavalent chromium, fluorides, and cyanides, all of which present significant environmental as well as health and safety problems. The constituents of a typical chromic acid conversion bath, such as ALODINE 1200, are as follows: $CrO_3$—"chromic acid" (hexavalent chromium); NaF—sodium fluoride; $KBF_4$—potassium tetrafluoroborate; $K_2ZrF_6$—potassium hexafluorozirconate; $K_3Fe(CN)_6$ potassium ferricyanide; and, $HNO_3$—nitric acid (for pH control).

Many aluminum structural parts, as well as Cd plated, Zn plated, Zn—Ni plated, and steel parts, throughout the aircraft and aerospace industry are currently being treated using this chromic acid process technology. Chromic acid conversion films, as formed on aluminum substrates, meet a 168 hours corrosion resistance criterion, but they primarily serve as a surface substrate for paint adhesion. Because of their relative thinness and low coating weights (40–150 milligrams/ft$^2$), chromic acid conversion coatings do not cause a fatigue life reduction in the aluminum structure.

However, environmental regulations in the United States, particularly in California, and in other countries are drastically reducing the allowed levels of hexavalent chromium compounds in effluents and emissions from metal finishing processes. Accordingly, chemical conversion processes employing hexavalent chromium compounds must be replaced. The present invention, which does not employ hexavalent chromium compounds, is intended to replace the previously used chromic acid process for forming conversion coatings on aluminum substrates.

SUMMARY OF THE INVENTION

A. In one respect, the invention is a process for forming a cobalt conversion coating on a metal substrate, thereby imparting corrosion resistance and paint adhesion properties. The invention was developed as a replacement for the prior art chromic acid process. The process includes the steps of: (a) providing a cobalt conversion solution comprising an aqueous reaction solution containing a soluble cobalt-III hexacoordinated complex, the concentration of the cobalt-III hexacoordinated complex being from about 0.01 mole per liter of solution to the saturation limit of the cobalt-III hexacoordinated complex; and (b) contacting the substrate with the aqueous reaction solution for a sufficient amount of time, whereby the cobalt conversion coating is formed. The substrate may be aluminum, aluminum alloy, as well as Cd plated, Zn plated, Zn—Ni plated, and steel. The cobalt-III hexacoordinated complex is preferably present in the form of $Me_m[Co(R)_6]_n$, wherein Me is Na, Li, K, Ca, Zn, Mg, or Mn, and wherein m is 2 or 3, n is 1 or 2, and R is a carboxylate having 1 to 6 C atoms.

B. In another aspect, the invention is a chemical conversion coating solution for producing a cobalt conversion coating on a metal substrate, the solution including an aqueous reaction solution containing a soluble cobalt-III hexacarboxylate complex, the concentration of the cobalt-III hexacarboxylate complex being from about 0.01 mole per liter of solution to the saturation limit of the cobalt-III hexacarboxylate complex. The cobalt conversion solution may be prepared by a bath makeup sequence including the steps of: (a) dissolving a metal carboxylate salt, such as sodium, magnesium, or calcium acetate; and (b) dissolving a soluble colbalt-II salt, preferably cobalt acetate, to form a cobalt conversion coating solution.

C. In yet another aspect to the invention, wetting agents such as alkyl fluorides, fluorocarbons, and metal fluorides can be added to the conversion coating solutions. Addition of these wetting agents eliminate the need for a costly sealing step following formation of the conversion coating.

BRIEF DESCRIPTION OF THE DRAWINGS

The figures herein contained are photomicrographs of images produced by a scanning electron microscope of coatings on aluminum alloy test panels. FIGS. 1 through 4 are photomicrographs (scanning electron microscope operated at 20 KV) of alloy 2024-T3 test panels with cobalt conversion coatings made by the invention. FIGS. 1 through 4 show cobalt conversion coatings formed by a 15 minute immersion in a typical cobalt conversion coating solution at 140° F.

The foregoing aspects and many of the attendant advantages of this invention will become more readily appreciated as the same becomes better understood by reference to the following detailed description, when taken in conjunction with the accompanying drawings, wherein:

FIG. 2 is a close-up, at higher magnification, of a small area of the test panel. The white bar is a length of 1 micron.

FIG. 4 is a close-up, at higher magnification, of a small area of the test panel. The aluminum substrate of the test panel is indicated by reference numeral 422. The white bar is a length of 1 micron.

DETAILED DESCRIPTION OF THE PREFERRED EMBODIMENT

The present invention relates to a new cobalt conversion coating. The cobalt conversion coating can be made so resistant to corrosion that the conventional sealing step is no longer required. This result is achieved by adding metal fluorides and wetting agents such as alkyl fluorides and fluorocarbons to the cobalt conversion coating solution. It is believed that the combination of the wetting agents and the metal fluorides impart a small etch effect on the aluminum substrate surface which is believed to aid in the coating formation.

By way of background leading up to this invention, the subject matter set forth in my prior copending applications will be reviewed. A considerable amount of empirical research was conducted in order to arrive at the present invention. A variety of multivalent compounds was investigated, used either by themselves or in combination with alkalis, acids, or fluorides. Among these compounds were vanadates, molybdates, cerates, ferrates and variety of borates. While film deposition of compounds containing these elements on aluminum alloy substrates has been achieved, none afforded any appreciable corrosion protection nor paint adhesion.

Cobalt amine complexes were thus produced with a number of reactants, i.e., $Co(NO_3) \cdot 6H_2O$, $CoCl_2 \cdot 6H_2O$, $NH_4NO_3$, $NH_4Cl$ and $NH_4OH$. The resultant coatings formed on aluminum substrates were found to have substantially improved corrosion resistant over the simple salt immersion described earlier. A review of cobalt complexing chemistry yielded the following information:

When a stream of air is drawn for several hours through a solution of cobalt-II salt, containing ammonium hydroxide, the corresponding ammonium salt and activated charcoal, then hexammine salts are obtained:

$$4\ Co\ X_2 + 4\ NH_4X + 20\ NH_3 + O_2 \rightarrow 4[Co(NH_3)_6]X_3 + water, \quad (1)$$

wherein X=Cl, Br, $NO_3$, CN, SCN, $\frac{1}{3}PO_4$, $\frac{1}{2}SO_4$, $C_2H_3O_2$, and $\frac{1}{2}CO_3$. In the absence of activated charcoal, replacement will occur to give:

$$[Co(NH_3)_5X]^{2+} \quad (2)$$

These generic reactions are based on the fact that cobalt-II salts have a strong tendency to oxidize to cobalt-III complexes, i.e., $$[Co(NH_3)_6X]^{2+} \rightleftharpoons [Co(NH_3)_6X]^{3+} + e^- \quad (3)$$

These reactions are not new and have been studied extensively. Cobalt-III complexes are typically made in the photo development industry as oxidizers to enhance clarity of color photography. What is surprising, however, is that cobalt complexes are capable of forming oxide structures on aluminum substrates. The exact reaction mechanism of this oxide formation is not completely understood, but is believed to function on the chemical equilibrium in Equation (3).

This oxidizing tendency is considered to be responsible for the formation of oxide films on aluminum substrates. Bath formulations were made up successfully using the following chemical balances below:

$$4\, Co(NO_3)_2 \cdot 6H_2O + 4\, NH_4NO_3 + 20\, NH_4OH + \text{oxygen} \rightarrow 4\, [Co(NH_3)_6](NO_3)_3 + H_2O \quad (4)$$

The ammonium nitrate is used to prevent initial precipitation of the reaction products. This chemistry is extensively reviewed in prior copending application Ser. No. 07/525,800, filed May 17, 1990.

An examination of reaction (4) revealed however, that while well defined iridescent coatings could be formed on aluminum substrates, an excess of ammonia, i.e., $NH_4OH$ was required to drive this reaction. As a consequence, it is difficult to control the pH of the bath due to the high evaporation rates of ammonia from the solution. Furthermore, the amount of excess ammonia in the bath had a pronounced effect on the paint adhesion and corrosion resistance characteristics of coatings formed by this method. Paint adhesion and corrosion resistance performance ranged from superb to complete failure, depending on the amount of ammonia in the bath.

A major advancement of this technology was achieved when a change in the portion of the complex that includes the ligand (the bracketed portion of formula (6)) within the cobalt complex was attempted. The development of the ammoniated cobalt complexes as described under reactions (1) through (4) established the bath chemistries as 3 valent cobalt amine complexes, i.e., $$[Co(NH_3)_6]X_3 \quad (5)$$

wherein X=Cl, Br, $NO_3$, CN, SCN, $\tfrac{1}{3}PO_4$, $\tfrac{1}{2}SO_4$, $C_2H_3O_2$, $\tfrac{1}{2}CO_3$, and wherein the portion of the complex that includes the ligand is positively charged, i.e., $$[Co(NH_3)_6]^{3+} \quad (6)$$

With the substitution of nitrite compounds for the ammonium compounds the formation of 3-valent cobalt complexes such as $$Me_3[Co(NO_2)_6], \text{ wherein } Me=Na, Li, K \quad (7)$$

was achieved where the portion of the complex that includes the ligand is negatively charged, i.e., $$[Co(NO_2)_6]^{3-} \quad (8)$$

This nitrite complexed chemistry was found to be completely self controlling with a stable pH in the region 6.8 to 7.2. Paint adhesion performance was also found to be substantially superior to prior chromated films. This chemistry is extensively discussed in my prior copending application Ser. No. 07/621,132. Two pronounced characteristics of conversion films formed with this nitrite technology was the almost clear (very light iridescence) surface appearance and the coating film weights which were limited at 90 mg/ft² maximum. These two limitations led to further research work to investigate the feasibility of obtaining coatings with strong, easily inspectable color indication along with higher coating weights, i.e., in excess of 90 mg/ft².

Successful formulations were finally made with the introduction of acetates to form complexes such as $$Me_3[Co(C_2H_3O_2)_6] \quad (9)$$

where the portion of the complex that includes the ligand is also negatively charged, i.e., $$[Co(C_2H_3O_2)_6]^{3-} \quad (10)$$

Coatings formed by this method are strongly colored, similar to prior chromated coatings in appearance. Coating weights in excess of 350 mg/ft² can be achieved. Nitrates such as $NaNO_3$, $Mg(NO_3)_2 \cdot 6H_2O$ or $Ca(NO_3)_2 \cdot 6H_2O$ were added to this formulation to aid in coating firmness at higher coating weight thus avoiding powdery loose deposits.

As a result of this research, two bath formulations that resulted in a clear coating and a colored coating were selected for further testing. The following two equations below establish the chemistries for the clear and colored cobalt conversion coatings.

Clear Coat:

$$Co(NO_3)_2 \cdot 6H_2O + 6NaNO_2 + \tfrac{1}{2}H_2O_2 \rightarrow Na_3[Co(NO_2)_6] + 2NaNO_3 + 2NaOH \quad (11)$$

Colored Coat:

$$Co(NO_3)_2 \cdot 6H_2O + 6CH_3COONH_4 + \tfrac{1}{2}H_2O_2 \rightarrow Na_3[Co(C_2H_3O_2)_6] + 2NH_4NO_3 + NH_4OH \quad (12)$$

When coatings are produced by equations (11) and (12) and are sealed subsequently in special formulated solutions, up to 140 hours of salt spray corrosion resistance are obtained when tested in accordance with ASTM B 117. This chemistry is extensively discussed in my prior copending application Ser. No. 07/732,568.

The research advances described up to this point involve conversion coatings formed from the reaction of a 2-valent cobalt salt such as $Co(NO_3)_2 \cdot 6H_2O$ with ammonium acetate ($CH_3COONH_4$) to form a 3-valent cobalt complex. The resultant coatings are of superb quality with regard to defined performance criteria; however, the bath life of solutions utilizing ammonium acetate are rather short, i.e., on the order of 30 to 40 days. The desire to extend this bath life was the basis for further research that was just recently completed. This work has now progressed to overall process and coating performance improvements in accordance with the present invention, as discussed in further detail below.

During testing of the ammonium acetate complexed cobalt solution (Equation (12)), it was noticed that after several weeks of normal tank operation the coating weights on aluminum substrates would gradually drop off and the color intensity would become lighter. In order to compensate for this, ever increasing immersion times were required. It was also noticed that a gradual solution appearance change would occur over time, from a dark brown to wine red color. Analysis finally established that a competing reaction was taking place over time, where the acetate in the complex

$$[Co(C_2H_3O_2)_6]^{3-} \quad (13)$$

would gradually be replaced by an ammonia to form the complex

$$[Co(NH_3)_6]^{3+} \quad (14)$$

Notice the valence change in these bracketed ionic species.

In an effort to solve this problem, it was discovered, in accordance with the present invention, that the substitution of a metal acetate such as $Na(C_2H_3O_2).3H_2O$, $Mg(C_2H_3O_2)_2.4H_2O$, or $Ca(C_2H_3O_2)_2.H_2O$ for the $NH_4(C_2H_3O_2)$ in Equation (12) would eliminate the above competing reactions described in conjunction with complexes (13) and (14), and result in the same strong colored coatings as the original ammonium acetate solutions. Sodium acetate is the most preferred metal carboxylate. Other metal carboxylates such as zinc, lithium, potassium, and manganese acetate will work but are not preferred. The typical reactions are $$2Co(C_2H_3O_2)_2.4H_2O + 3\ Mg(C_2H_3O_2)_2.4H_2O + 2HC_2H_3O_2 \rightarrow Mg_3[Co(C_2H_3O_2)_6]_2 + 21H_2O \qquad (15)$$

$$Co(C_2H_3O_2)_2.4H_2O + 3Ca(C_2H_3O_2)_2.H_2O + \tfrac{1}{2}O_2 + 2HC_2H_3O_2 \rightarrow Ca_3[Co(C_2H_3O_2)_6]_2 + 21H_2O \qquad (16)$$

$$Co(C_2H_3O_2)_2.4H_2O + 3Na(C_2H_3O_2).3H_2O + \tfrac{1}{2}O_2 + HC_2H_3O_2 \rightarrow Na_3[Co(C_2H_3O_2)_6] + 13\tfrac{1}{2}H_2O \qquad (17)$$

These reactions are carried out by bubbling air through the solution without the use of hydrogen peroxide. The acetic acid is not added as a reactant, but is formed in solution as part of the complex chemical reaction. The resultant conversion coatings are further improved in corrosion resistance over those conversion coating solutions produced by the reactions of Equations (11) and (12) when subjected to salt spray testing per ASTM B117. In the broader context, it has been found that a cobalt conversion coating having superior performance characteristics can be produced by reacting a soluble cobalt salt with a metal carboxylate in accordance with the following general formula $$\text{Soluble Cobalt Salt} + Me(R)_x \rightarrow Me_m[Co(R)_6]_n, \qquad (18)$$

wherein x can be 1 or 2, m is 3, n is 1 or 2, Me is selected from the group consisting of Na, Li, K, Ca, Zn, Mg, and Mn, and wherein R is a carboxylate having from 1 to 5 carbon (C) atoms, provided the carboxylates are soluble in the reaction solution.

Metal fluorides such as $MgF_2$ and $CaF_2$ and wetting agents such as water soluble alkyl-fluorides and fluorocarbons can also be added in very small quantities to these solutions (Tables III and IV) to improve corrosion protection and manufacturing ease. In particular, alkyl fluoride wetting agents such as MSP-ST alkyl fluoride by M&T Harshaw, Cleveland, Ohio, and fluorocarbons $FC_{99}$ or $FC_{95}$ wetting agents by 3M Company, St. Paul, Minn., have been successfully used. The presence of the fluorinated wetting agents, metal fluorides, or mixtures thereof raise the corrosion performance level of resultant coatings to such a degree that sealing of these conversion coatings in a secondary seal step is no longer required. In principle, any water soluble fluorinated wetting agent capable of lowering liquid surface tension into the range of 30 to 40 dynes per centimeter at 20° C. is usable. Solutions operated as detailed below yield coatings that pass a 168 hours salt spray corrosion resistance criteria in accordance with Boeing Process Specification BAC 5719, "Chromated Conversion Coatings." The single step conversion coating has yielded in excess of 240 hours of salt spray resistance before showing any sign of corrosion pitting.

It became apparent during experimentation with formulations (16), (17) and (18) that certain parameters are critical with respect to both make-up, chemistry and consistency of coating performance. These parameters were found to be bath makeup and process sequence, reactant selection and bath concentrations, temperature control, and immersion times. It must also be emphasized that the reaction system created is very complex and involves several simultaneous reversible reactions. It is believed that the entire reaction system must be present at or near an equilibrium condition in order to achieve optimum results in accordance with the present invention.

Reactant Selection and Solution Concentrations

The most critical parameters affecting performance of conversion coatings with respect to paint adhesion and corrosion resistance were found to be selection of the reactants and their concentrations in solution. It was found that coating performance was affected foremost by these factors rather than bath temperature or immersion time, although temperature and immersion time do impart their effects over larger variations of these parameters.

It is known that with respect to surface treatments of aluminum, paint adhesion and corrosion resistance are divergent properties. In other words, maximizing paint adhesion usually occurs at the expense of corrosion performance and vice-versa. This surface treatment behavior was also found to exist with cobalt conversion coatings. The research carried out and described in this and the aforementioned prior copending applications has established a preferential list with regard to the various cobalt compounds and their corrosion resistance effectiveness versus paint adhesion.

TABLE I

Performance Rating of Cobalt Salts Using Metal Acetates for Complexing

| Component | Corrosion Resistance | Paint Adhesion |
| --- | --- | --- |
| Cobalt Acetate + Me Acetate | 1 | 2 |
| Cobalt Nitrate + Me Acetate | 3 | 1 |
| Cobalt Sulfate + Me Acetate | 2 | 4 |
| Cobalt Chloride + Me Acetate | 4 | 3 |

Rating: 1 = best, 4 = worst

It can be seen from Table I that the cobalt acetate formulations present the best possible combination with respect to corrosion resistance while maintaining good paint adhesion performance. It should be noted, however, that in cases where corrosion performance is not a factor, nitrates or nitrites yield the best paint adhesion performance that is achievable with these cobalt complexed salts.

Cobalt acetate is the most preferred soluble cobalt-II salt. Other water soluble cobalt salts such as $Co(NO_3)_2$, $CoSO_4$, $CoCl_2$, $CoPO_4$, $CoCO_3$, may be substituted for cobalt acetate, but are not preferred for the reasons illustrated in Table I. These cobalt salts are preferably reacted with soluble metal carboxylates having from 1 to 5 carbon atoms, although metal salts of acetic acid are most preferred. The carboxylate salts of Ca, Mg, and Na are preferred, with the Na carboxylate being most preferred, while Zn, Li, K, and Mn may also be used. The limitations on using carboxylates other than the acetates is water solubility. Other carboxylates that will work are for example sodium propionate. The minimum solubility needed to produce an effective coating is about 0.01 moles of cobalt-II salt per liter of water at 20° C. (68° F.). The salts may be used up to their solubility limits.

Although not required, fluorinated wetting agents may be added to the bath as discussed above. When these wetting agents are employed, a conversion coating is created that does not need to be subjected to a conventional sealing step in order to exhibit satisfactory corrosion resistance.

Chemical Concentration, pH Control, Temperature, and Immersion Time

With respect to chemical concentrations, the concentration of dissolved cobalt-II salt used may be from about 0.01 mole per liter of final solution up to the solubility limit of the cobalt-II salt employed at 20° C. (68° F.). Preferably, the concentration of dissolved cobalt-II salt used may be from about 0.04 mole per liter of final solution up to 0.15 mole per liter of final solution.

The concentration of the cobalt-III hexcarboxylate coordination complex may be from about 0.01 mole per liter of final solution up to the solubility limit of the cobalt-III hexcarboxylate coordination complex employed. Preferably, the concentration of the cobalt-III hexcarboxylate coordination complex may be from about 0.04 mole per liter of final solution up to 0.15 mole per liter of final solution.

The concentration of dissolved metal carboxylate, preferably a metal acetate, may be from about 0.03 to 2.5 moles per liter of final solution. Preferably, the concentration of dissolved metal carboxylate used may be from about 0.05 mole per liter of final solution up to 0.2 mole per liter of final solution.

When employed, the concentration of the fluorinated wetting agents is preferably sufficient to hold solution surface tension between 30 to 40 dynes per centimeter at 20° C. The metal fluorides, $MgF_2$ and $CaF_2$, may be present in a concentration from 0 to solubility limit. It is to be understood that the fluorinated wetting agents, metal fluorides, or mixtures thereof are not required, but are preferred. If the wetting agents and metal fluorides are not used, the conversion coating must be subjected to a sealing step to achieve high corrosion resistance. By using the wetting agents and fluorides, the sealing step can be eliminated, thus making the use of the present invention even more economical.

The pH of the bath may be from about 5.0 to 9.0 with 6.0 to 7.5 being preferred and 6.5 being most preferred. The temperature of the bath may be from about 68° F. to 160° F. Above 160° F., gradual decomposition of the cobalt-III hexcarboxylate complex may occur. The optimum temperature is 140°±5° F. The immersion time may be from about 3 minutes to 60 minutes, more preferably from 5 to 30 minutes. When sodium acetate is employed, the immersion time can be reduced to 5 to 8 minutes. Use of these parameters will result in coating weights ranging for example from 20 to 240 mg/ft$^2$.

Preferred Bath Preparation Sequence

The following bath make up sequence is preferred for the acetate complexed cobalt solution:
1. A stainless steel tank is equipped with air agitation and temperature control equipment capable of controlling temperature within ±5° F. (The tank may be lined with an inert material capable of withstanding 150° F. continuous operation.)
2. The tank is filled to ¾-full with deionized water and heated to 120° F. Air agitation is commenced to achieve a gentle boil.
3. The applicable amount of metal acetate salt is now added and dissolved. For larger tanks, a fine meshed holding basket will serve as a holding device aiding in the dissolution of the material.
4. The applicable amount of cobalt salt is then added and dissolved. A gentle air boil of the tank solution is maintained for another four hours at which time the reaction is mostly completed. A holding basket may also be used to aid in dissolution.
5. The solution is now heated to 140° F. and the required small amounts of fluorinated wetting agent are added. Air agitation is maintained for an additional two hours. The tank is now ready for operation.

Preferred Overall Processing Sequence

The preferred overall processing sequence may be summarized as follows:
1. Preclean
2. Mask and Rack
3. Alkaline Clean
4. Rinse at Room Temperature
5. Deoxidize
6. Rinse at Room Temperature
7. Form Oxide Conversion Coating
8. Rinse at Room Temperature
9. Dry General Notes With Respect To The Above Process Flow Charts The cobalt conversion coating should be applied after all trimming and fabrication have been completed. Parts, where solution entrapment is possible, should not be subjected to immersion alkaline cleaning or immersion deoxidizing; manual cleaning and manual deoxidizing procedures should be used to obtain water break-free surfaces before applying cobalt conversion treatment. A water break-free surface is a surface which maintains a continuous water film for a period of at least 30 seconds after having been sprayed or immersion rinsed in clean water at a temperature below 100° F.

Thorough rinsing and draining throughout processing is necessary as each solution should be completely removed to avoid interference with the performance of the next solution in the sequence. Parts should be processed from one step to the next without delay and without allowing the parts to dry. When it is necessary to handle wet parts, clean latex rubber gloves should be worn. After conversion coating, handle dry parts only with clean fabric gloves. For processing systems which require part clamping, the number and size of contact points should be kept to a minimum as necessary for adequate mechanical support.

Preclean

Vapor degrease may be performed in accordance with Boeing Process Specification BAC 5408. Emulsion clean in accordance with Boeing Process Specification BAC 5763, or solvent clean in accordance with Boeing Process Specification BAC 5750 if parts are greasy or oily. Parts with open flaying surfaces or spot-welded joints where solution entrapment is possible should be immersed in cold water (or in hot and cold water) for 2 minutes after precleaning.

Mask and Rack

Areas which do not require cobalt conversion coatings should be masked with maskants. Dissimilar metal inserts (except chromium, nickel or cobalt alloy or plating, CRES, or titanium) and non-aluminum coated plasma flame sprayed area should be masked off. Parts are then racked in holding baskets or mounted on holding fixtures.

Alkaline Clean

Alkaline clean and rinse may be performed in accordance with Boeing Process Specification BAC 5749, except for parts with open faying surfaces or spot welded joints, in which case, rinsing should be for at least 10 minutes using agitation with multiple immersions (a minimum of four times) followed by manual spray rinsing as required to prevent solution entrapment.

Deoxidize

Deoxidize and rinse may be performed in accordance with Boeing Process Specification BAC 5765 except for parts where solution entrapment is possible, which parts may be rinsed using the method described above under "Alkaline Cleaning". Castings may be deoxidized by either of the following methods:

a. Deoxidize in accordance with Boeing Process Specification BAC 5765, Solution 37, 38 or 39.

b. Dry abrasive blast castings in accordance with Boeing Process Specification BAC 5748, Type II, Class 1 and rinse.

A specific solution formulation within the scope of the invention is as set forth in TABLE II, below.

TABLE II

Preferred Solution Formulation

| Component[1] | Makeup Per Liter | Control Range |
|---|---|---|
| Cobalt Acetate $Co(C_2H_3O_2)_2.4H_2O$ | 33.0 gm | 30–35 gm |
| Magnesium Acetate $Mg(C_2H_3O_2)_2.4H_2O$ or | 85.0 gm | 80–90 gm |
| Calcium Acetate $Ca(C_2H_3O_2)_2.H_2O$ or | 70.0 gm | 65–75 gm |
| Sodium Acetate $Na(C_2H_3O_2).H_2O$ | 125.0 gm | 120–130 gm |
| Alkyl-Fluoride (MSP-ST) | 4–5 ml | 2 |
| Magnesium Fluoride $MgF_2$ or | 2 gm | 1–3 gm |
| Calcium Fluoride $CaF_2$ | 2 gm | 1–3 gm |
| Operating Temperature | 100° F. (Makeup) | 135–145° F. (operation) |
| Immersion Time | | 5–20 min. (5 to 8 Min. for Na Acetate) |

[1]Coatings formed with this technology do not require sealing for corrosion resistance.
[2]Maintain solution surface tension between 30 to 40 dynes per centimeter.

Bath temperature variations and immersion times also contribute to corrosion performance and paint adhesion, however, to a significantly lesser degree than the solution reactant selection. It was determined that the variations in both temperatures and immersion time will affect the coating thickness primarily while the reactant materials primarily influence coating structure and density. The following general performance effects were observed:

1. Optimum bath temperature from the standpoint of corrosion and adhesion was found to be 140° F.±5° F.
2. An increase in bath temperature from optimum does result in thicker and looser coatings and thus a decrease in paint adhesion with an increase in corrosion resistance.
3. A decrease in bath temperature from optimum results in thinner coatings with an increase in paint adhesion and a decrease in corrosion resistance.
4. The optimum time was found to be a function of reactant selection.
5. For nitrite complexed cobalt salts the optimum immersion time was 20–25 minutes at optimum bath temp.
6. For acetate complexed cobalt salts the optimum immersion was found to be a function of the type of acetate being used, i.e.

| For $Na(C_2H_3O_2)$ | 5–8 min | @ 140° F. |
| For $Mg(C_2H_3O_2)_2$ | 15–20 min | @ 140° F. |
| For $Ca(C_2H_3O_2)_2$ | 12–15 min | @ 140° F. |

Figure 1:
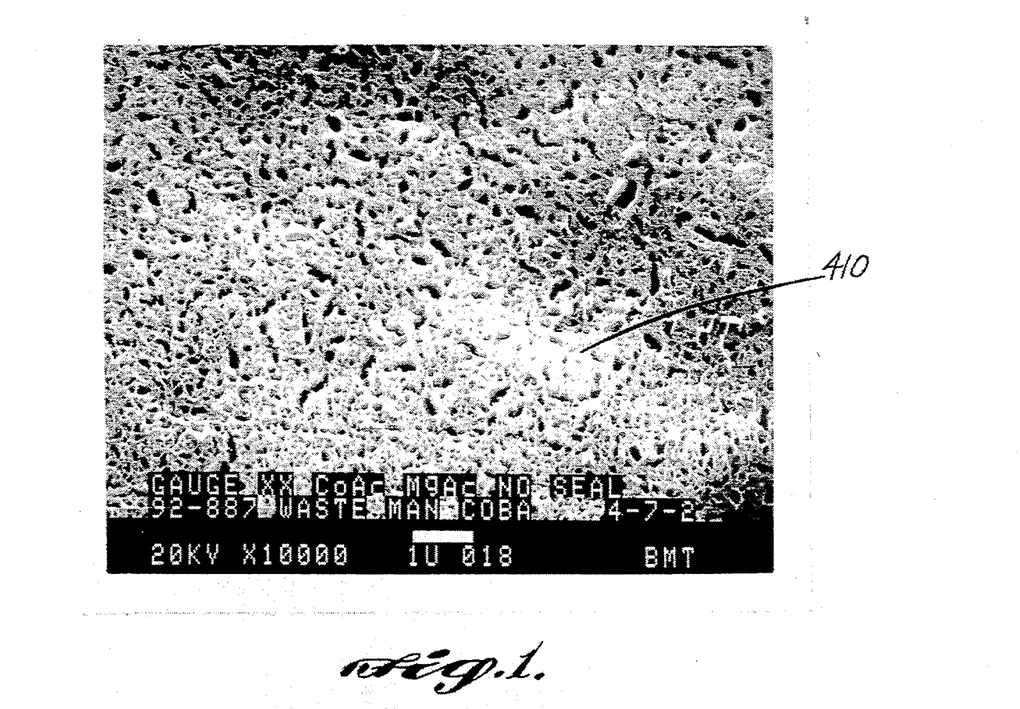
FIG. 1 is a photomicrograph at ×10,000 magnification of a test panel showing a cobalt conversation coating 410 of the invention. The photomicrograph is a top view of the upper surface of oxide coating 410. The top of oxide coating 410 is porous and looks like a sponge. This test panel was immersed in the cobalt conversion coating/solution for 15 minutes. The white bar is a length of 1 micron.
Figure 2:
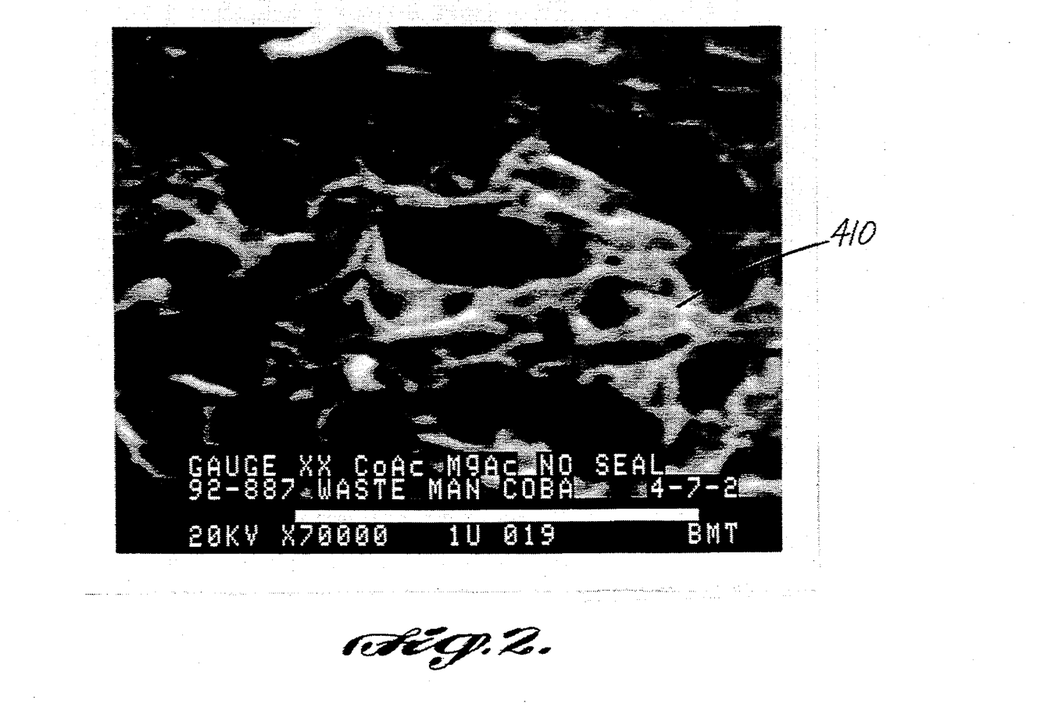
FIG. 2 is a photomicrograph at ×70,000 magnification of the test panel of FIG. 1. The photomicrograph is a top view of the upper surface of oxide coating 410.
Figure 3:
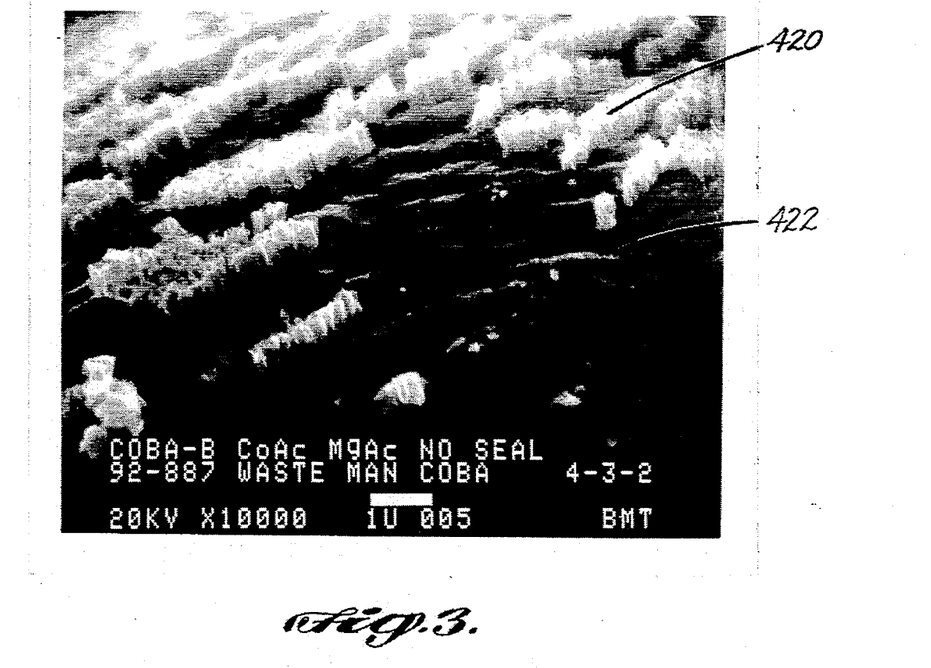
FIG. 3 is a photomicrograph at ×10,000 magnification of another test panel showing a side view, from an elevated angle, of a fractured cross section of a cobalt conversion coating 420 of the invention. The fractured cross section of the aluminum substrate of the test panel is indicated by reference numeral 422. This test panel was immersed in the coating bath for 15 minutes. To make the photomicrograph, the test panel was bent and broken off to expose a cross section of oxide coating 420. The white bar is a length of 1 micron.
Figure 4:
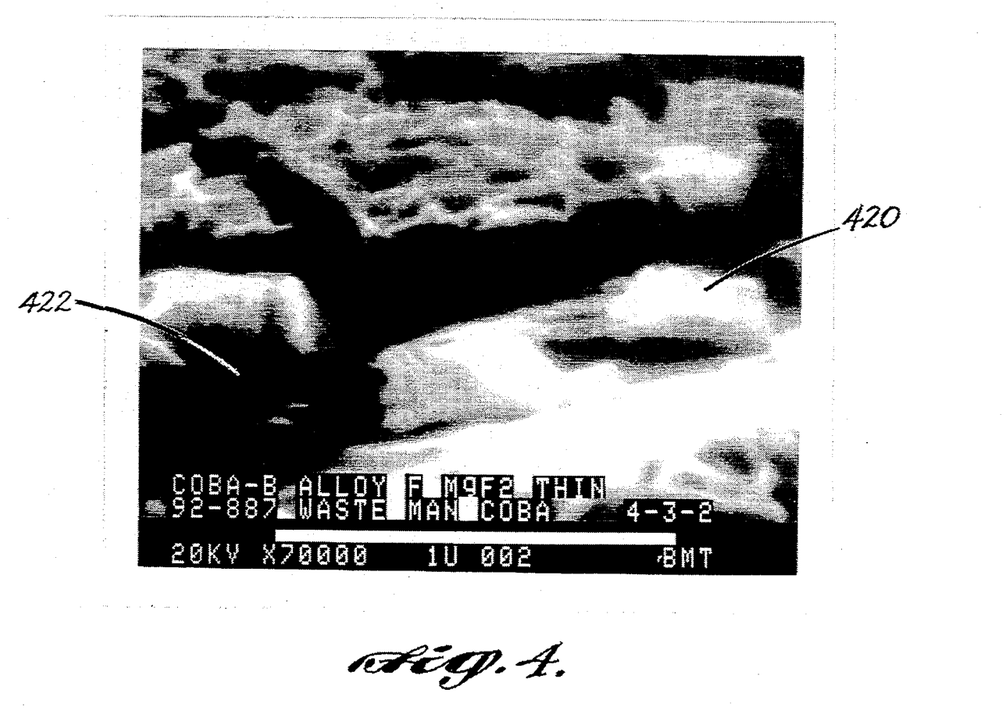
FIG. 4 is a photomicrograph at ×70,000 magnification of the test panel of FIG. 3 showing a side view, from an elevated angle, of a fractured cross section of cobalt conversion coating 420 of the invention.
Figure 5:
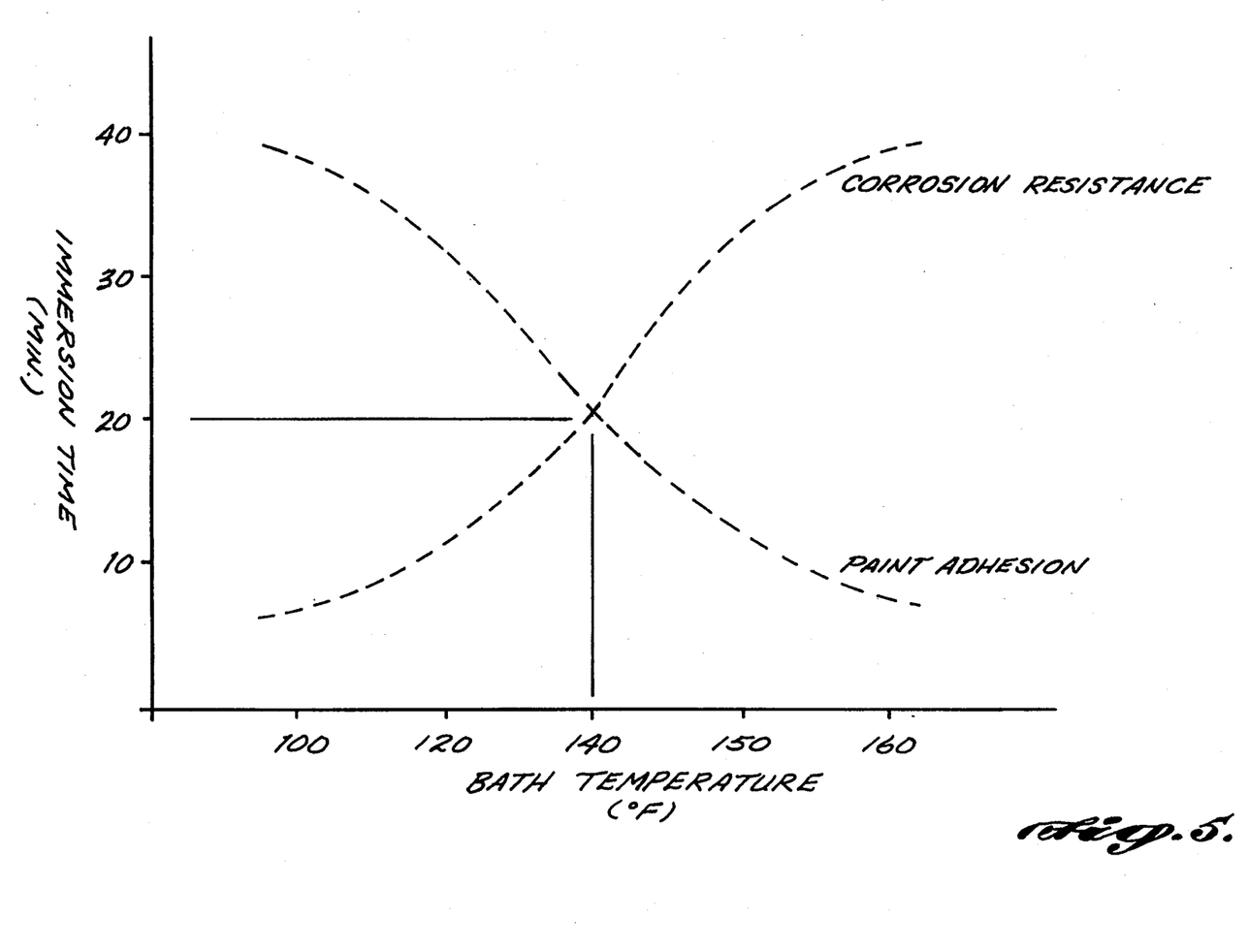
FIG. 5 is a graph showing the tradeoff between paint adhesion and corrosion resistance as a function of immersion time.

FIG. 5 depicts the general behavior of cobalt conversion coatings with respect to corrosion performance vs. paint adhesion. The intercept point of the corrosion and adhesion curve represents the bath parameters where the two divergent properties (corrosion and adhesion) are at optimum with respect to each other.

It is preferred that the pH be maintained between pH 6.0 and 7.5, although coatings have been produced between pH 5.0 and 9.0. Adjustments to the pH may be required after the solutions have been used for extended periods.

Corrosion Resistance

Utilizing the basic corrosion resistance behavior of complexed cobalt salts, as shown above, the cobalt acetate formulations were investigated extensively. Cobalt acetate was complexed with sodium acetate $Na(C_2H_3O_2).3H_2O$ or magnesium acetate $Mg(C_2H_3O_2)_2.4H_2O$. The results show that these formulations have excellent corrosion resistance without a subsequent seal step. Salt spray corrosion testing was conducted in accordance with ASTM B117 and all specimens were subjected to 168 hr. exposure. See Tables III and IV for results. The test conditions were repeated two more times and near identical results to Tables III and IV were obtained. Analysis of this data in conjunction with basic paint adhesion data, as well as other solution maintenance parameters has resulted in the optimum tank makeup and controls as listed under Table II, above. A final question on corrosion performance and color iridescence was answered with this work. This research established why sodium acetate $Na(C_2H_3O_2).3H_2O$ was chosen as the most preferred complexer over magnesium acetate $Mg(C_2H_3O_2)_2.4H_2O$. The reason is that sodium acetate imparts a somewhat more aggressive etch effect on the aluminum substrate. This by itself was found to be very detrimental to corrosion performance. However, when sodium acetate was chemically formulated with wetting agents and metal fluorides, it had the distinct advantage that bright color iridescence of coatings were maintained while corrosion resistance was not impaired. On the other hand, when magnesium acetate or calcium acetate were utilized in conjunction with the wetting agents and metal fluorides very little etch effect was imparted and resultant coatings were rather weak in color effect.

TABLE III

Salt Spray Corrosion Testing of Cobalt Complex Formulations To ASTM B117 - Single Step Immersion - No Seal

| Component | Bath Temp Deg. F. | Immersion Time (minutes) | Salt Spray Corrosion Resistance (168 hrs. ASTM B117) |
|---|---|---|---|
| $Co(C_2H_3O_2).6H_2O$ and $Na(C_2H_3O_2).3H_2O$ complexed | 120 | 5 | fail |
| | 120 | 10 | fail |
| | 120 | 15 | fail |
| | 120 | 20 | mar- |

TABLE III-continued

Salt Spray Corrosion Testing of Cobalt Complex Formulations
To ASTM B117 - Single Step Immersion - No Seal

| Component | Bath Temp Deg. F. | Immersion Time (minutes) | Salt Spray Corrosion Resistance (168 hrs. ASTM B117) | |
|---|---|---|---|---|
| plus | | | ginal | |
| $MgF_2$ and | 140 | 5 | pass | |
| Alkyl-fluoride (MSP-ST) | 140 | 10 | pass | |
| | 140 | 15 | pass | |
| | 140 | 20 | pass | |
| | 150 | 5 | pass | |
| | 150 | 10 | pass | (powdery coat) |
| | 150 | 15 | pass | (powdery coat) |
| | 150 | 20 | pass | (powdery coat) |
| $Co(C_2H_3O_2)_2.6H_2O$ and | 120 | 5 | fail | |
| $Mg(C_2H_3O_2)_2.4H_2O$ | 120 | 10 | fail | |
| complexed | 120 | 15 | fail | |
| | 120 | 20 | fail | |
| plus | | | | |
| $MgF_2$ and | 140 | 5 | pass | stained |
| Alkyl-fluoride (MSP-ST) | 140 | 10 | pass | stained |
| | 140 | 15 | pass | stained |
| | 140 | 20 | pass | stained |
| | 150 | 5 | pass | stained |
| | 150 | 10 | pass | stained |
| | 150 | 15 | pass | stained |
| | 150 | 20 | pass | stained |
| Control ALODINE 1200S (current chromated system) | BAC 5719 | | pass | |

TABLE IV

Paint Adhesion Test Results on BMS 10-11[1] Paint System

| Component | Bath Temp | Immersion Time | BMS 10-11 Coating | Wet | Dry |
|---|---|---|---|---|---|
| $Co(C_2H_3O_2).6H_2O$ and | 120 | 20 | TYPE I | 10 | 10 |
| $Mg(C_2H_3O_2)_2.4H_2O$ | 120 | 20 | TYPE I & II | 10 | 10 |
| complexed | 120 | 30 | TYPE I | 10 | 10 |
| | 120 | 30 | TYPE I & II | 9 | 10 |
| | 140 | 20 | TYPE I | 10 | 9 |
| | 140 | 20 | TYPE I & II | 9 | 10 |
| | 140 | 30 | TYPE I | 10 | 10 |
| | 140 | 30 | TYPE I & II | 9 | 10 |
| $CO(C_2H_3O_2)_2.6H_2O$ | 120 | 10 | TYPE I | 10 | 10 |
| $Na(C_2H_3O_2).3H_2O$ | 120 | 10 | TYPE I & II | 10 | 10 |
| complexed | 120 | 15 | TYPE I | 9 | 10 |
| | 120 | 15 | TYPE I & II | 9 | 10 |
| | 140 | 10 | TYPE I | 10 | 10 |
| | 140 | 10 | TYPE I & II | 10 | 10 |
| | 140 | 15 | TYPE I | 9 | 9 |
| | 140 | 15 | TYPE I & II | 9 | 9 |
| Control ALODINE 1200S | BAC 5719 OR MIL-C-5541 | | TYPE I | 9 | 10 |
| | | | TYPE I & II | 9 | 10 |

Rating: 10 = Best
1 = Worst
TYPE I - Chromated epoxy primer (aircraft high-performance coating)
TYPE II - Non-chromated epoxy enamel topcoat (aircraft high performance coating)
[1]Boeing Material Specification BMS 10-11 is a highly crosslinked epoxy primer system and details the performance requirements of those coatings

Oxide Coating Analyses

ESCA surface analysis, using a Perkin-Elmer Model 550 surface analyzer, and Auger oxide profiles, using the same machine (in a different operating mode), have been performed in order to characterize the cobalt conversion coatings of the invention. (ESCA = electron spectroscopy for chemical analysis (also known as XPS or X-ray photoelectron spectroscopy).) These analyses show that the cobalt conversion coating consists of a mixture of oxides, namely, aluminum oxide $Al_2O_3$ as the largest volume percent, and cobalt oxides CoO, $Co_3O_4$, and $Co_2O_3$. The term "largest volume percent" means that the volume of this oxide exceeds the volume of any other oxide which is present, but the term "largest volume present" does not necessarily imply that the volume of this oxide is more than 50 volume percent.

The data further shows that in the lower portion of the oxide coating (that is, next to the aluminum substrate), the largest volume percent is $Al_2O_3$. The middle portion of the oxide coating is a mixture of CoO, $Co_2O_3$, $Co_3O_4$, and $Al_2O_3$. And the data shows that in the top portion of the oxide coating, the largest volume percent is a mixture of $Co_2O_3$ and $Co_3O_4$.

Additional characterization of the cobalt conversion coatings of the invention may be found in FIGS. 1 through 4 and in the descriptions of FIGS. 1 through 4 above. FIGS. 1 through 4 show a cobalt conversion coating 410 and 420 formed by a 15 minute immersion in a typical cobalt conversion coating solution. The top surface of the cobalt conversion coating, as shown in FIGS. 1 through 4 bears a resemblance to a sponge, thus providing substantial surface area and porosity for good paint adhesion. Below the top surface, the coating becomes more dense and solid (non-porous).

Other Methods of Application

The above formulation illustrates producing cobalt conversion coatings by immersion application. The same principles apply to producing the conversion coating by manual application and by spray application.

As will be apparent to those skilled in the art to which the invention is addressed, the present invention may be embodied in forms other than those specifically disclosed above, without departing from the spirit or essential characteristics of the invention. The particular embodiments of the invention described above and the particular details of the processes described are therefore to be considered in all respects as illustrative and not restrictive. The scope of the present invention is as set forth in the appended claims rather than being limited to the examples set forth in the foregoing description. Any and all equivalents are intended to be embraced by the claims.

The embodiments of the invention in which an exclusive property or privilege is claimed are defined as follows:

1. A process for forming an oxide film cobalt conversion coating on a metal substrate, said process comprising the steps of:
   (a) providing an oxide film forming cobalt conversion solution comprising an aqueous reaction solution comprising a soluble cobalt-III hexacoordinated complex, where said cobalt-III hexacoordinated complex is present in the form of $Me_m[Co(R)_6]_n$, wherein Me is one or more selected from the group consisting of Na, Li, K, Ca, Zn, Mg and Mn, and wherein m is 2 or 3, n is 1 or 2, and R is a carboxylate having from 1 to 5 C atoms, the concentration of said cobalt-III hexacoordinated complex being from about 0.01 mole per liter of said aqueous reaction solution up to the saturation limit of said cobalt-III hexacoordinated complex; and
   (b) contacting said substrate with said aqueous reaction solution for a sufficient amount of time to oxidize the surface of said substrate, whereby said oxide film cobalt conversion coating is formed.

2. The process of claim 1 wherein an alkyl fluoride or fluorocarbon wetting agent is added to said aqueous reaction solution in the amount required to produce a liquid surface tension of 30 to 40 dynes per centimeter.

3. The process of claim 1 wherein R is acetate.

4. The process of claim 1 wherein the concentration of said cobalt-III hexacoordinated complex is from about 0.04 mole per liter of solution up to about 0.15 mole per liter of solution.

5. The process of claim 1 wherein said aqueous reaction solution has a pH of about 5.0 to 9.0.

6. The process of claim 1 wherein said aqueous reaction solution has a temperature of about 68° F. to 160° F.

7. The process of claim 1 wherein said substrate is contacted with said aqueous reaction solution for a time of about 3 minutes to 60 minutes.

8. A process for forming an oxide film cobalt conversion coating on a metal substrate, said process comprising the steps of:
   (a) providing an oxide film forming cobalt conversion solution comprising an aqueous reaction solution comprising a soluble cobalt-III hexacarboxylate complex, the concentration of said cobalt-III hexacarboxylate complex being from about 0.01 mole per liter of said aqueous reaction solution up to the saturation limit of said cobalt-III hexacarboxylate complex; and
   (b) contacting said substrate with said aqueous reaction solution for a sufficient amount of time to oxidize the surface of said substrate, whereby said oxide film cobalt conversion coating is formed.

9. A process for forming an oxide film cobalt conversion coating on a metal substrate, said process comprising the steps of:
   (a) providing an oxide film forming cobalt conversion solution comprising an aqueous reaction solution prepared by reacting a cobalt-II salt with a metal carboxylate having from 1 to 5 carbon atoms, wherein the concentration of said cobalt-II salt is from about 0.04 mole per liter of final solution up to about 0.15 mole per liter of final solution, and the concentration of metal carboxylate is from about 0.03 to 2.5 mole per liter of final solution; and
   (b) contacting said substrate with said aqueous reaction solution for a sufficient amount of time to oxidize the surface of said substrate, whereby said oxide film cobalt conversion coating is formed.

10. The process of claim 8 wherein R is acetate.

11. The process of claim 8 wherein the concentration of said cobalt-III hexacarboxylate complex is from about 0.04 mole per liter of solution up to about 0.15 mole per liter of solution.

12. The process of claim 8 wherein said aqueous reaction solution has a pH of about 5.0 to 9.0.

13. The process of claim 8 wherein said aqueous reaction solution has a temperature of about 68° F. to 160° F.

14. The process of claim 8 wherein said substrate is contacted with said aqueous reaction solution for a time of about 3 minutes to 60 minutes.

15. A process for forming an oxide film cobalt conversion coating on a substrate, wherein said substrate is aluminum or aluminum alloy, said process comprising the steps of:
   (a) providing an oxide film forming cobalt conversion solution comprising an aqueous reaction solution comprising a soluble cobalt-III hexacoordinated complex, where said cobalt-III hexacoordinated complex is present in the form of $Me_m[Co(R)_6]_n$, wherein Me is one or more selected from the group consisting of Na, Li, K, Ca, Zn, Mg and Mn, and wherein m is 2 or 3, n is 1 or 2, and R is a carboxylate having from 1 to 5 C atoms, the concentration of said cobalt-III hexacoordinated complex being from about 0.01 mole per liter of said aqueous reaction solution up to the saturation limit of said cobalt-III hexacoordinated complex; and
   (b) contacting said substrate with said aqueous reaction solution for a sufficient amount of time to oxidize the surface of said substrate, whereby said oxide film cobalt conversion coating is formed.

16. The process of claim 15 wherein an alkyl fluoride or fluorocarbon wetting agent is added to said aqueous reaction solution in the amount required to produce a liquid surface tension of 30 to 40 dynes per centimeter.

17. The process of claim 15 wherein R is acetate.

18. The process of claim 15 wherein the concentration of said cobalt-III hexacoordinated complex is from about 0.04 mole per liter of solution up to about 0.15 mole per liter of solution.

19. The process of claim 15 wherein said aqueous reaction solution has a pH of about 5.0 to 9.0.

20. The process of claim 15 wherein said aqueous reaction solution has a temperature of about 68° F. to 160° F.

21. The process of claim 15 wherein said substrate is contacted with said aqueous reaction solution for a time of about 3 minutes to 60 minutes.

22. An article produced by the process of claim 17.

23. A process for forming an oxide film cobalt conversion coating on a substrate, wherein said substrate is aluminum or aluminum alloy, said process comprising the steps of:
   (a) providing an oxide film forming cobalt conversion solution comprising an aqueous reaction solution prepared by reacting a cobalt-II salt with a metal carboxylate having from 1 to 5 carbon atoms, wherein the concentration of said cobalt-II salt is from about 0.04 mole per liter of final solution up to about 0.15 mole per liter of final solution, and the concentration of metal carboxylate is from about 0.03 to 2.5 mole per liter of final solution; and (b) contacting said substrate with said aqueous reaction solution for a sufficient amount of time to oxidize the surface of said substrate, whereby said oxide film cobalt conversion coating is formed.

24. The process of claim 23 wherein said cobalt-II salt is a cobalt-II salt which has a minimum solubility of about 0.01 moles of cobalt-II salt per liter of water at 20° C. (68° F.).

25. The process of claim 23 wherein said cobalt-II salt is cobalt acetate.

26. The process of claim 23 wherein said aqueous reaction solution is prepared by a bath makeup sequence comprising:

(a) dissolving said metal carboxylate salt; and
(b) then adding said cobalt-II salt.

27. The process of claim 23 wherein said aqueous reaction solution has a pH of about 5.0 to 9.0.

28. The process of claim 23 wherein said cobalt aqueous reaction has a temperature of about 68° F. to 160° F.

29. The process of claim 23 wherein said substrate is contacted with said aqueous reaction solution for a time of about 3 minutes to 60 minutes.

30. An article produced by the process of claim 23.

31. A chemical conversion coating solution for producing an oxide film cobalt conversion coating on a metal substrate, said solution comprising an aqueous reaction solution comprising a soluble cobalt-III hexacoordinated complex, wherein said cobalt-III hexacoordinated complex is present in the form of $Me_m[Co(R)_6]_n$, wherein Me is one or more selected from the group consisting of Na, Li, K, Ca, Zn, Mg and Mn, and wherein m is 2 or 3, n is 1 or 2, and R is a carboxylate having from 1 to 5 C atoms, the concentration of said cobalt-III hexacoordinated complex being from about 0.01 mole per liter of said aqueous reaction solution up to the saturation limit of said cobalt-III hexacoordinated complex.

32. The solution of claim 31 wherein an alkyl fluoride or fluorocarbon wetting agent is added to said aqueous reaction solution in the amount required to produce a liquid surface tension of 30 to 40 dynes per centimeter.

33. A chemical conversion coating solution for producing an oxide film cobalt conversion coating on a metal substrate, said solution comprising:

(a) an aqueous reaction solution comprising a soluble cobalt-III carboxylate complex, the concentration of said cobalt-III carboxylate complex being from about 0.01 mole per liter of said aqueous reaction solution up to the saturation limit of said cobalt-III carboxylate complex;

(b) wherein said aqueous reaction solution is prepared by reacting a cobalt-II salt with a metal carboxylate salt having from 1 to 5 C atoms, wherein the concentration of said cobalt-II salt is from about 0.01 mole per liter of final solution up to the saturation limit of the cobalt-II salt employed, the concentration of said metal carboxylate salt is from about 0.03 to 2.5 mole per liter of final solution.

34. The solution of claim 33 wherein said cobalt-II salt is a cobalt-II salt which has a minimum solubility of about 0.01 mole of cobalt-II salt per liter of water at 20° C. (68° F.).

35. The solution of claim 33 wherein said cobalt-II salt is cobalt acetate.

36. The solution of claim 33 wherein said metal is selected from the group consisting of Na, Li, K, Ca, Zn, Mg and Mn.

37. The solution of claim 33 wherein said metal carboxylate is a metal acetate.

38. The solution of claim 33 wherein said aqueous reaction solution is prepared by a bath makeup sequence comprising:

(a) dissolving said metal carboxylate; and
(b) then adding said cobalt-II salt.

39. The solution of claim 33 wherein said aqueous reaction solution has a pH of about 5.0 to 9.0.

40. The solution of claim 33 wherein said aqueous reaction solution has a temperature of about 68° F. to 160° F.

41. A chemical conversion coating solution for producing an oxide film cobalt conversion coating on a metal substrate, wherein said substrate is aluminum or aluminum alloy, said solution comprising an aqueous reaction solution comprising a soluble cobalt-III hexacoordinated complex, wherein said cobalt-III hexacoordinated complex is present in the form of $Me_m[Co(R)_6]_n$, wherein Me is one or more selected from the group consisting of Na, Li, K, Ca, Zn, Mg and Mn, and wherein m is 2 or 3, n is 1 or 2, and R is a carboxylate having from 1 to 5 C atoms, the concentration of said cobalt-III hexacoordinated complex being from about 0.01 mole per liter of said aqueous reaction solution up to the saturation limit of said cobalt-III hexacoordinated complex.

42. The process of claim 41 wherein an alkyl fluoride or fluorocarbon wetting agent is added to said aqueous reaction solution in the amount required to produce a liquid surface tension of 30 to 40 dynes per centimeter.

43. A chemical conversion coating solution for producing an oxide film cobalt conversion coating on a metal substrate, wherein said substrate is aluminum or aluminum alloy, said solution comprising:

(a) an aqueous reaction solution comprising a soluble cobalt-III hexacarboxylate complex, the concentration of said cobalt-III hexacarboxylate complex being from about 0.01 mole per liter of said aqueous reaction solution up to the saturation limit of said cobalt-III hexacarboxylate complex;

(b) wherein said aqueous reaction solution is prepared by reacting a cobalt-II salt with a metal carboxylate salt having from 1 to 5 C atoms, wherein the concentration of said cobalt-II salt is from about 0.01 mole per liter of final solution up to the saturation limit of the cobalt-II salt employed, the concentration of said metal carboxylate salt is from about 0.03 to 2.5 mole per liter of final solution.

44. The solution of claim 43 wherein said cobalt-II salt is a cobalt-II salt which has a minimum solubility of about 0.01 moles per liter of water at 20° C. (68° F.).

45. The solution of claim 43 wherein said cobalt-II salt is cobalt acetate.

46. The solution of claim 43 wherein said aqueous reaction solution is prepared by a bath makeup sequence comprising the steps of:

(a) dissolving said metal carboxylate; and
(b) then adding said cobalt-II salt.

47. The solution of claim 43 wherein said aqueous reaction solution has a pH of about 5.0 to 9.0.

48. The solution of claim 43 wherein said aqueous reaction solution has a temperature of about 68° F. to 160° F.

49. An oxide film coated article exhibiting corrosion resistance and paint adhesion properties, said article comprising:
(a) a substrate, said substrate being aluminum or aluminum alloy; and
(b) an oxide film cobalt conversion coating formed on said substrate, said oxide film cobalt conversion coating comprising aluminum oxide $Al_2O_3$ as the largest volume percent, and one or more cobalt oxides from the group consisting of $CoO$, $Co_2O_3$, and $Co_3O_4$.

50. The coated article of claim 49 wherein:
(a) in the portion of said cobalt conversion coating adjacent said substrate, the largest volume percent of said coating consists essentially of $Al_2O_3$;
(b) in the top portion of said cobalt conversion coating, the largest volume percent of said coating consists essentially of a mixture of $Co_2O_3$ and $Co_3O_4$; and
(c) in the portion of said cobalt conversion coating therebetween, said coating consists essentially of a mixture of $CoO$, $Co_2O_3$, $Co_3O_4$, and $Al_2O_3$.

51. The article of claim 49 wherein said cobalt conversion coating has a coating weight of about 20 to 240 $mg/ft^2$.

52. The article of claim 49 wherein the top of said cobalt conversion coating is porous and has the appearance of sponge as shown in FIGS. 1, 2, 3 and 4.

53. A process for forming an oxide film cobalt conversion coating exhibiting corrosion resistance and paint adhesion properties on a substrate, wherein said substrate is aluminum or aluminum alloy, said process comprising the steps of:
(a) providing an oxide film forming cobalt conversion reaction solution comprising an aqueous reaction solution prepared by reacting cobalt acetate with a metal acetate selected from the group consisting of Mg, Ca, and Na acetate, wherein the concentration of said cobalt acetate is about 30 to 35 grams per liter of final solution and the concentration of said metal acetate is about 65 to 130 grams per liter of final solution; and
(b) contacting said substrate with said solution for a sufficient amount of time to oxidize the surface of said substrate, whereby said oxide film cobalt conversion coating is formed, thereby imparting corrosion resistance and paint adhesion properties to said substrate.

54. The process of claim 53 wherein an alkyl fluoride or fluorocarbon wetting agent is added to said aqueous reaction solution in the amount required to produce a liquid surface tension of 30 to 40 dynes per centimeter.

55. The process of claim 53 wherein $MgF_2$, $CaF_2$ or mixtures thereof are added to said aqueous reaction solution in an amount ranging from 2 to 4 grams per liter of final solution.

56. The process of claim 53 wherein said aqueous reaction solution is prepared by a bath makeup sequence comprising:
(a) adding and dissolving said metal acetate;
(b) then adding and dissolving said cobalt acetate.

57. The process of claim 53 wherein said aqueous reaction solution has a pH of about 6.0 to 7.0.

58. The process of claim 53 wherein said aqueous reaction solution has a temperature of about 140°±5° F.

59. The process of claim 53 wherein said substrate is contacted with said aqueous reaction solution for a time of about 5 minutes to 30 minutes.

60. The process of claim 53 wherein the concentration of the cobalt acetate is 33 grams per liter of final solution and of metal acetate is 70 to 125 grams per liter of final solution.

61. A process for forming an oxide film cobalt conversion coating exhibiting corrosion resistance and paint adhesion properties on a substrate, wherein said substrate is aluminum or aluminum alloy, said process comprising the steps of:
(a) providing an oxide film forming cobalt conversion solution comprising an aqueous reaction solution prepared by reacting cobalt acetate with a metal acetate selected from the group consisting of magnesium, calcium, and sodium acetate and mixtures thereof, wherein the concentration of said cobalt acetate is about 30 to 35 grams per liter of final solution and the concentration of said metal acetate is about 65 to 130 grams per liter of final solution; and
(b) contacting said substrate with said solution for a sufficient amount of time to oxidize the surface of said substrate, whereby said oxide film cobalt conversion coating is formed, thereby imparting corrosion resistance and paint adhesion properties to said substrate.

62. The process of claim 61 wherein said aqueous reaction solution is prepared by a bath makeup sequence comprising:
(a) adding and dissolving said metal acetate;
(b) then adding and dissolving said cobalt acetate.

63. The process of claim 61 wherein said aqueous reaction solution has a pH of about 6.0 to 7.5.

64. The process of claim 61 wherein said aqueous reaction solution has a temperature of about 140°±5° F.

65. The process of claim 61 wherein said substrate is contacted with said aqueous reaction solution for a time of about 15 minutes to 25 minutes.

66. A process for forming an oxide film cobalt conversion coating exhibiting corrosion resistance and paint adhesion properties on a substrate, wherein said substrate is aluminum or aluminum alloy, said process comprising the steps of:
(a) providing an oxide film forming cobalt conversion solution comprising an aqueous reaction solution of a soluble cobalt-III hexacarboxylate complex, wherein said cobalt-III hexacarboxylate complex is present in the form of $Me_m[Co(R)_6]_n$ wherein Me is one or more selected from the group consisting of Na, Li, K, Ca, Zn, Mg and Mn, and wherein m is 2 or 3, n is 1 or 2, and R is a carboxylate having from 1 to 5 C atoms, and wherein said cobalt-III hexacarboxylate complex was made by reacting a cobalt-II carboxylate salt with a metal carboxylate such that the concentration of said cobalt-III hexacarboxylate complex is from about 0.1 mole per gallon of solution to the solubility limit of said cobalt-III hexacarboxylate complex; and
(b) contacting said metal substrate with said solution for a sufficient amount of time to oxidize the surface of said substrate, whereby said oxide film cobalt conversion coating is formed, thereby imparting corrosion resistance and paint adhesion properties to said substrate.

67. The process of claim 66 wherein said aqueous reaction solution has a pH of about 6.0 to 7.0.

68. The process of claim 66 wherein said aqueous reaction solution has a temperature of about 135° F., to 145° F.

69. The process of claim 66 wherein said substrate is contacted with said aqueous reaction solution for a time of about 3 minutes to 60 minutes.

70. A process for forming an oxide film cobalt conversion coating exhibiting corrosion resistance and paint adhesion properties on a substrate, wherein said substrate is aluminum, aluminum alloy, magnesium, magnesium alloy, a Cd plated substrate, or a Zn—Ni plated substrate, said process comprising the steps of:
(a) providing an oxide film forming cobalt conversion reaction solution comprising an aqueous reaction solution prepared by reacting a cobalt-II salt with a metal carboxylate salt, wherein the concentration of said cobalt-II salt is from about 0.1 moles per gallon of final solution to the solubility limit of the cobalt-II salt employed and the concentration of said metal carboxylate salt is from about 0.03 to 2.5 moles per gallon of final solution; and
(b) contacting said substrate with said aqueous reaction solution for a sufficient amount of time to oxidize the surface of said substrate, whereby said oxide film cobalt conversion coating is formed, thereby imparting corrosion resistance and paint adhesion properties to said substrate.

71. The process of claim 70 wherein said cobalt-II salt is cobalt acetate.

72. The process of claim 70 wherein the metal of said metal carboxylate is selected from the group consisting of Na, K, Li, Ca, Zn, Mg and Mn.

73. The process of claim 70 wherein a fluorinated wetting agent is added to said aqueous reaction solution to assist in the formation of said cobalt conversion coating on said substrate.

74. The process of claim 73 wherein said wetting agent is selected from the group consisting of an alkyl fluoride, fluorocarbons, $CaF_2$, $MgF_2$, and mixtures thereof.

75. The process of claim 70 wherein said aqueous reaction solution is prepared by a bath makeup sequence comprising:
(a) adding and dissolving said metal carboxylate;
(b) then adding and dissolving said cobalt-II salt.

76. The process of claim 70 wherein said substrate is contacted with said aqueous reaction solution for a time of about 3 minutes to 60 minutes.

77. The process of claim 9 wherein R is acetate.

78. The process of claim 9 wherein the concentration of said cobalt-III hexacarboxylate complex is from about 0.04 mole per liter of solution up to about 0.15 mole per liter of solution.

79. The process of claim 9 wherein said aqueous reaction solution has a pH of about 5.0 to 9.0.

80. The process of claim 9 wherein said aqueous reaction solution has a temperature of about 68° F. to 160° F.

81. The process of claim 9 wherein said substrate is contacted with said aqueous reaction solution for a time of about 3 minutes to 60 minutes.

* * * * *